(12) United States Patent
O'Regan et al.

(10) Patent No.: US 8,917,175 B2
(45) Date of Patent: Dec. 23, 2014

(54) METHOD AND TRACKING DEVICE FOR TRACKING MOVEMENT IN A MARINE ENVIRONMENT WITH TACTICAL ADJUSTMENTS TO AN EMERGENCY RESPONSE

(75) Inventors: Peter R. O'Regan, Dhahran (SA); Ali Amer Almohsen, Ras Tanura (SA)

(73) Assignee: Saudi Arabian Oil Company, Dhahran (SA)

( * ) Notice: Subject to any disclaimer, the term of this patent is extended or adjusted under 35 U.S.C. 154(b) by 160 days.

(21) Appl. No.: 13/454,812

(22) Filed: Apr. 24, 2012

(65) Prior Publication Data
US 2013/0063304 A1    Mar. 14, 2013

Related U.S. Application Data

(60) Provisional application No. 61/478,823, filed on Apr. 25, 2011.

(51) Int. Cl.
| | |
|---|---|
| *G08B 1/08* | (2006.01) |
| *G01S 19/17* | (2010.01) |
| *G01S 5/00* | (2006.01) |
| *G01S 19/14* | (2010.01) |
| *G01S 1/68* | (2006.01) |
| *G01S 19/42* | (2010.01) |
| *B63B 22/24* | (2006.01) |
| *E02B 15/04* | (2006.01) |

(52) U.S. Cl.
CPC .............. *G01S 19/17* (2013.01); *G01S 5/0027* (2013.01); *G01S 19/14* (2013.01); *G01S 1/68* (2013.01); *G01S 19/42* (2013.01); *B63B 22/24* (2013.01); *E02B 15/04* (2013.01); *B63B 2213/02* (2013.01)

USPC ............... 340/539.13; 340/539.1; 340/539.2; 340/603; 340/618

(58) Field of Classification Search
USPC ...................................... 340/539.13
See application file for complete search history.

(56) References Cited

U.S. PATENT DOCUMENTS

| | | | | |
|---|---|---|---|---|
| 5,481,904 A | * | 1/1996 | Fleck et al. | ........... 73/61.51 |
| 5,532,679 A | * | 7/1996 | Baxter, Jr. | .......... 340/539.26 |

(Continued)

OTHER PUBLICATIONS

Replacement International Search Report and Written Opinion for Related PCT Application PCT/US2012/034939, dated Jan. 30, 2013.

(Continued)

*Primary Examiner* — Travis Hunnings
(74) *Attorney, Agent, or Firm* — Bracewell & Giuliani LLP; Jeffrey S. Whittle; Taylor P. Evans

(57) ABSTRACT

The present invention relates to devices and methods for tracking movement in a marine environment. At least one tracking device that is adapted to be deployed on a surface of the water, wherein the tracking device is capable of moving along the same trajectory of a desired object. Data from the tracking devices are received by at least one satellite, transmitted to a database, and used to determine the forecasted trajectory of the desired object. All data collected from deployed tracking devices may be integrated into a spatial data repository for analysis and reporting using GIS and associated information technologies, thereby allowing for more accurate decision-making and asset deployment during a fluid spill or similar marine contamination event. The present invention also allows for the collection and modeling of accurate localized sea current data, which may assist with marine and coastal engineering works such as shoreline protection and port dredging.

11 Claims, 6 Drawing Sheets

(56) References Cited

U.S. PATENT DOCUMENTS

| | | | |
|---|---|---|---|
| 5,654,692 A * | 8/1997 | Baxter et al. | 340/539.17 |
| 5,793,813 A | 8/1998 | Cleave | |
| 6,317,029 B1 | 11/2001 | Fleeter | |
| 7,009,550 B2 | 3/2006 | Moeller-Jensen | |
| 7,965,172 B2 * | 6/2011 | Angell et al. | 340/10.1 |
| 2004/0257264 A1 * | 12/2004 | Moeller-Jensen | 342/52 |
| 2012/0089332 A1 * | 4/2012 | Hong | 702/2 |
| 2013/0063300 A1 * | 3/2013 | O'Regan et al. | 342/357.25 |

OTHER PUBLICATIONS

Coppini, G., et al. Hindcast of Oil-Spill Pollution During The Lebanon Crisis in The Eastern Mediterranean, Marine Pollution Bulletin, 2011, pp. 140-153, vol. 62, Elsevier.

Garcia-Ladona, F., et al., The Use of Surface Drifting Floats in the Monitoring of Oil Spills: The Prestige Case, 2005 International Oil Spill Conference, pp. 1-5, [www.iosc.org/papers/IOSC%202005%20a367.pdf].

Goodman, R.H., Simecek-Beatty, D. and Hodgins, D., Tracking Buoys for Oil Spills, pp. 431-445, 1994, [http://www.iosc.org/papers/02212.pdf].

Monahan, E. C. and Monahan E.A., Trends in Drogue Design, Limnology and Oceanography, Nov. 1973, pp. 981-985, vol. 18 No. 6, Published by: American Society of Limnology and Oceanography [Stable URL: http://www.jstor.org/stable/2834592].

http://www.argos-system.org/html/services/tracking-monitoring_en.html.

Product Website: Dry Pak® Floating Waterproof GPS/PDA/Smart Phone Case http://www.overtons.com/modperl/product/details.cgi?pdesc=Dry-Pak-Floating-Waterproof-GPS/PDA/Smart-Phone-Case&i=72601&str=dry+pak+floating+waterproof&merchID=4005.

Product Website: SPOT® Satellite GPS Messenger: http://www.findmespot.com/downloads/SPOT2-SellSheet.pdf.

Duckham, M., Kulik, L., Worboys, M. and Galton, A., Efficient Generation of Simple Polygons for Characterizing the Shape of a Set of Points in the Plane, Jan. 11, 2008, pp. 1-32, Elsevier.

Kato, et al., Spilled Oil Tracking Autonomous Buoy, Dept. of Naval Architecture and Ocean Engineering, Graduate School of Engineering, Osaka University, Osaka, Japan.

PCT Partial International Search Results mailed Aug. 27, 2012.

International Search Report and Written Opinion for Related PCT Application PCT/US2012/034939, dated Nov. 28, 2012.

\* cited by examiner

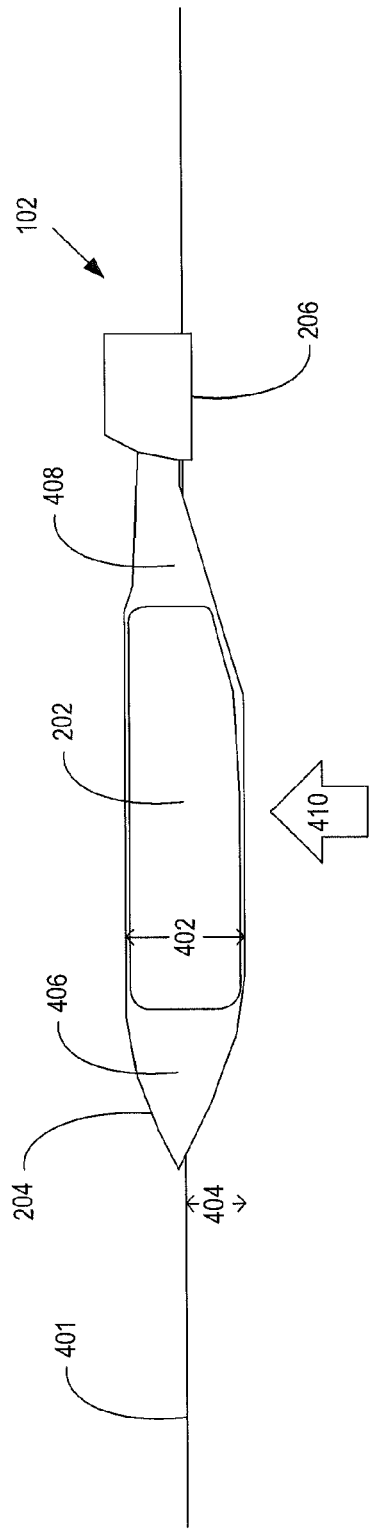
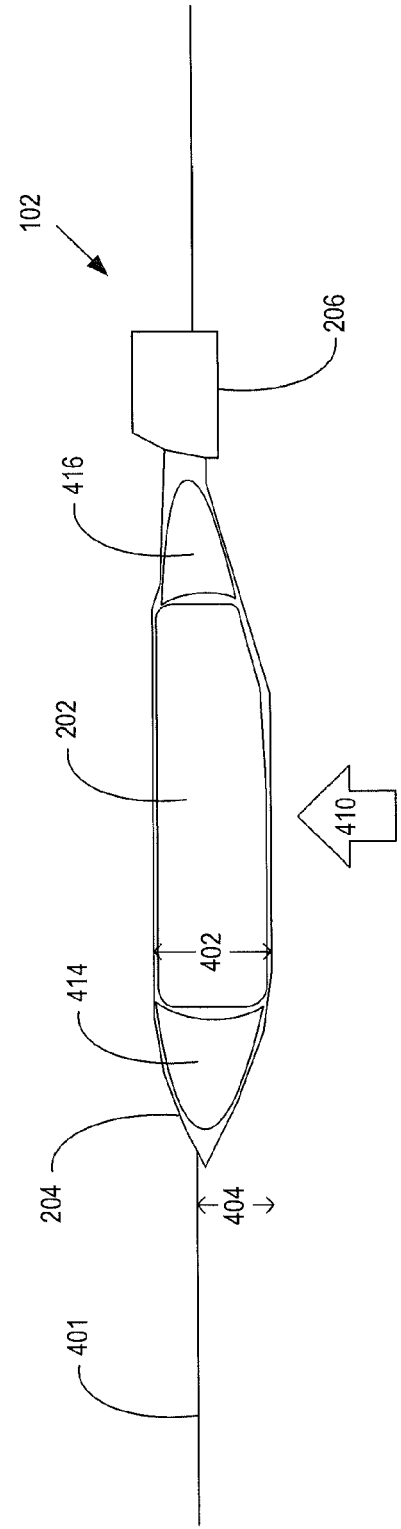

METHOD AND TRACKING DEVICE FOR TRACKING MOVEMENT IN A MARINE ENVIRONMENT WITH TACTICAL ADJUSTMENTS TO AN EMERGENCY RESPONSE

CROSS REFERENCE TO RELATED APPLICATIONS

This application claims the benefit of the filing date of U.S. Provisional Patent Application No. 61/478,823, filed on Apr. 25, 2011, the disclosure of which is incorporated herein by reference.

This application relates to U.S. Non-provisional patent application Ser. No. 13/454,780, by O'Regan et al, titled "Method, System, and Machine to Track Fluid Spills When Moving With Water Flow," filed on Apr. 24, 2012, the disclosure of which is incorporated by reference herein in its entirety.

BACKGROUND OF THE INVENTION

1. Field of the Invention

Embodiments of the invention relate to devices and methods for tracking movement. More specifically, embodiments of the present invention relate to tracking devices for use in a marine environment, and the utilization of the tracking devices for marine engineering and design, real-time operations monitoring, and emergency response.

2. Description of the Related Art

During a fluid spill emergency, responders need to know two essential facts upfront: (1) the exact location and size of the oil slick, and (2) the potential impact of the slick on industrial facilities and sensitive environmental areas. These facts are monitored throughout the duration of the emergency to plan oil containment and recovery efforts, and monitor the effectiveness of the response efforts. Currently, fluid spill responders gain this information through visual observations and verbal radio reports from in-field support vessels, plus periodical aircraft flyovers. This approach is subjective and has some fundamental limitations—especially at night when visibility is effectively zero. Storms and severe offshore weather conditions can also restrict the deployment of helicopters and pollution control assets, while at the same time, accelerating the movement of the oil slick via stronger sea currents.

Along with visual observations, fluid spill responders make extensive use of computerized oil slick trajectory models. These simulate the expected movement and fate of the oil based on complex mathematical calculations, scientific assumptions and weather forecasts. Although these models are useful tools, they can never correctly estimate the actual or true path of the oil, due to limitations in both the mathematical models and the weather and sea-state forecasts. Although scientific prediction helps with "best-guess" tactical planning, the reality of the oil slick's dispersion is what matters.

Previous attempts to monitor oil slicks have utilized rigid and heavy, industrially-fabricated floatation buoys to house electronic tracking devices, such as those described in U.S. Pat. No. 5,481,904 (Fleck, 1996), and U.S. Pat. No. 5,654,692 (Baxter, 1997). Additionally, maritime government agencies and academic institutes have experimented with floating tracking buoys for over 3 decades. For example, in 1994, Goodman and Beatty empirically field tested different combinations of floating buoys and electronics packages (see Ron H. Goodman, Debra Simecek-Beatty, and Don Hodgins, *Tracking Buoys for Oil Spills, International Oil Spill Conference* (1994) available at http://iosc.org/papers/02212.pdf). Similarly, Garcia-Ladona et. al (2002) tested different "surface drifting floats" to monitor and predict the movement of the Prestige oil slick off the North Western Spanish Coast (see Garcia-Ladona, Font et al *The use of surface drifting floats in the monitoring of oil spills: the Prestige case, International Oil Spill Conference* (2005) available at www.iosc.org/papers_posters/IOSC%202005%20a367.pdf). The goal in all cases is to create a device that will float at the same velocity and direction as the oil. In reality, none of these devices has achieved the goal. The monitors used in the prior art have been large rigid, industrially fabricated floating buoys that project a significant amount of surface area above the water level. This surface area results in significant aerodynamic wind forces that cause such buoys to have velocities and directions different than that of the sea surface or fluid spilled into the sea.

The prior art has employed expensive, bulky transponders such as ARGOS. Beyond the physical limitations of such buoys, the cost has been a barrier to mainstreaming tracking buoys into the fluid spill responder's 'tool kit'. These prior art spill tracking devices had limited value beyond fluid spill tracking due to their size, weight and cost.

The software interfaces and data flows used in the prior art have been limited. The raw data has typically been transmitted from the floating device and sent directly to a scientist or technician's laptop computer, where it has been interpreted and made into custom one-off map diagrams. These maps have then been relayed to stakeholders via email or Powerpoint presentations. It is an ad hoc, "grass-roots" approach to communication and decision-making which leads to errors and time delays.

It would be beneficial to develop a device that could not only be useful for fluid spills, but that could be used in other applications such as determining the precise location of fluid spill containment booms, small support vessels or other assets; functioning as a marker buoy to show the position of live diving operations; locating a life raft at an offshore facility; and acting as a personal locator attached to a life vest of workers conducting tasks at hazardous offshore facilities.

Therefore a low-cost, multipurpose solution to address these shortfalls would be desirable.

SUMMARY OF THE INVENTION

The device and method of the current application provides a new, low-cost tool for emergency responders to accurately measure and map the actual movement of sea currents or oil slicks regardless of weather, sea-state, or visibility. Embodiments of the invention enhance both the emergency preparedness and tactical decision making capabilities of those who work in a marine environment. This enables fluid spill responders and management stakeholders to see the exact location and behavior of the oil slick, and rapidly plan strong contingency measures such as sea water intake protection. The solution is low-cost, ruggedized, simple to deploy, and can be integrated with a company's standard enterprise information technology systems.

Tracking devices used previously to track sea surface currents and/or spilled fluid were limited due to their size, weight and cost. The aerodynamic design of prior devices did not facilitate accurate tracking on the sea water surface.

In addition to 24 hour tracking of oil slicks, embodiments of the invention have potential use in marine search and rescue operations. For example, during a man overboard event, one of the devices/tools could be deployed in the immediate vicinity of the person's last position (e.g. an offshore platform or sinking vessel). The device would travel with and transmit the actual sea currents in a local offshore area. This would enable incident commanders to accurately estimate the local sea currents and focus rescue resources down current. This could potentially save time, resources, and most importantly—lives.

Embodiments of the invention could also be attached to emergency life rafts stationed at offshore oil and gas processing facilities. This would serve as a low-cost and effective locator beacon in the event of the raft being deployed.

Beyond the safety applications, embodiments of the invention could provide marine supervisors and planners with an accurate overview of portable offshore assets and operations. For example, the device could be used to mark the location of under-sea dive crews doing underwater welding at an offshore pipeline or platform. Providing a unified map-based view of all diving operations would encourage optimization of resources, and could also improve health and safety by improving awareness of where the crews are operating.

In alternative applications, accurate, local sea current data could be economically collected to directly support offshore engineering projects such as causeway placement, sea water intake upgrades, sea channel dredging etc. Using live sea surface current data would dramatically improve the accuracy of fluid spill trajectory models and help drive more accurate tactical decisions and dynamic contingency plans. The tracking devices could be deployed into the sea during emergency drills to simulate a moving fluid spill or a man overboard event. Such mapping would improve the realism of offshore drills. It would also enable the fluid spill trajectory models or sea surface mapping models to be scrutinized during an integrated scenario, with historic playback during a post-incident review.

Data collected with embodiments of the present invention could also support the design of marine engineering projects such as upgrading sea-water intakes, or dredging of sea channels. By deploying a number of these devices, accurate sea-current data could be collected across any project area on several dates to measure and understand circulation patterns and seasonal variability. Such data is expensive to collect using conventional approaches.

The device and method of the current application is designed to provide live situational awareness of complex operations taking place in the vast and hazardous marine environment. The system and device is fully waterproof and can be quickly deployed into the sea to map the location of oil slicks, people, assets or routine but hazardous operations. Embodiments of the invention uses global positioning systems technology and satellite communications technology to relay data (location, speed, status, and timestamp) of the oil slick or floating asset at regular intervals, such as every 10 minutes. The tool would securely transmit that data directly into a designated enterprise's geographic information systems (GIS) mapping software applications through traditional intranet systems. Custom software interfaces securely consolidate the data and present it graphically on pre-existing information systems—in particular GIS. Authorized support staff and management stakeholders could then visualize the overall location and status of all critical marine operations on detailed, interactive map displays on their personal computers or mobile devices.

In one embodiment, a method for tracking movement in a marine environment includes associating a number of tracking devices with a fluid spill event and deploying the tracking devices in a fluid spill, where each tracking device transmits its geographic location to a data processing satellite. The method further includes the constant monitoring of each tracking device's geographical location and velocity to track the movement of the fluid spill over a period of time, determining a forecasted trajectory of the fluid spill based on the sensor-determined movement of the fluid spill over the period of time, and responsively adjusting a spill response based on the forecasted trajectory.

In another embodiment, a tracking device for tracking movement in a marine environment includes a global positioning system (GPS) unit having a GPS receiver adapted to receive global positioning signals from three or more remote global positioning satellites, the global positioning signals being broadcast at a GPS frequency in a range of about 1.17-1.58 GHz, a satellite transmitter to send a geographic location of the GPS unit to a data processing satellite at a frequency of around 1.6 GHz, the data processing satellite further transmitting the geographic location for storage in a positioning satellite data repository, a processor, operatively connected to the GPS receiver and the satellite transmitter, adapted to determine the geographic location of the GPS unit based on the global positioning signals, and a housing adapted to be held by a user of the GPS unit and having the GPS receiver, the satellite transmitter, and the processor therein. The tracking device further includes a waterproof container of a flexible material having an interior region adapted to receive the GPS unit and having the GPS unit therein, the waterproof container sealable to prevent ingress of fluid and to float the tracking device on the actual surface of a fluid spill.

In another embodiment, a waterproof container for protecting a global positioning system (GPS) unit in a marine environment includes an interior region adapted to receive the GPS unit and having the GPS unit therein, the interior region including an anterior buoyancy pocket and a posterior buoyancy pocket relative to the GPS unit, a sealing member that is sealable to prevent an ingress of fluid and to form the anterior buoyancy pocket and the posterior buoyancy pocket, the waterproof container having a volume in a range of around 300-600 mL while sealed with the GPS unit in the interior region, and a covering of a flexible material defining the interior region, the covering having a substantially flat upper surface that is adapted to minimize wind drag and water surface displacement while the waterproof container is deployed in a fluid spill or deployed for scientific recording of localized sea surface currents.

BRIEF DESCRIPTION OF THE DRAWINGS

So that the manner in which the above-recited features, aspects and advantages of the invention, as well as others that will become apparent, are attained and can be understood in detail, more particular description of the invention briefly summarized above can be had by reference to the embodiments thereof that are illustrated in the drawings that form a part of this specification. It is to be noted, however, that the appended drawings illustrate some embodiments of the invention and are, therefore, not to be considered limiting of the invention's scope, for the invention can admit to other equally effective embodiments.

FIGS. 4A-4B are schematic views of a tracking device in accordance with one or more embodiments of the invention.

DETAILED DESCRIPTION OF THE DISCLOSURE

As discussed in more detail below, provided in some embodiments are systems and methods for tracking movement using low-cost tracking devices, which can be useful for emergency response planning, fluid spill response planning, sea current measurement, or other applications in which movement is tracked in a marine environment. In one embodiment, the method for tracking movement in a marine environment includes the steps of associating a number of tracking devices with a fluid spill event and deploying the multiple tracking devices in a fluid spill, where each of the multiple tracking devices transmits its exact geographic location and velocity to a data processing satellite. The method further includes monitoring the geographic location of each of the multiple tracking devices to track the movement of the fluid spill over a period of time, determining a forecasted trajectory of the fluid spill based on the sensor-determined movement of the fluid spill over the period of time, and responsively adjusting a spill response based on the forecasted trajectory.

Figure 1:
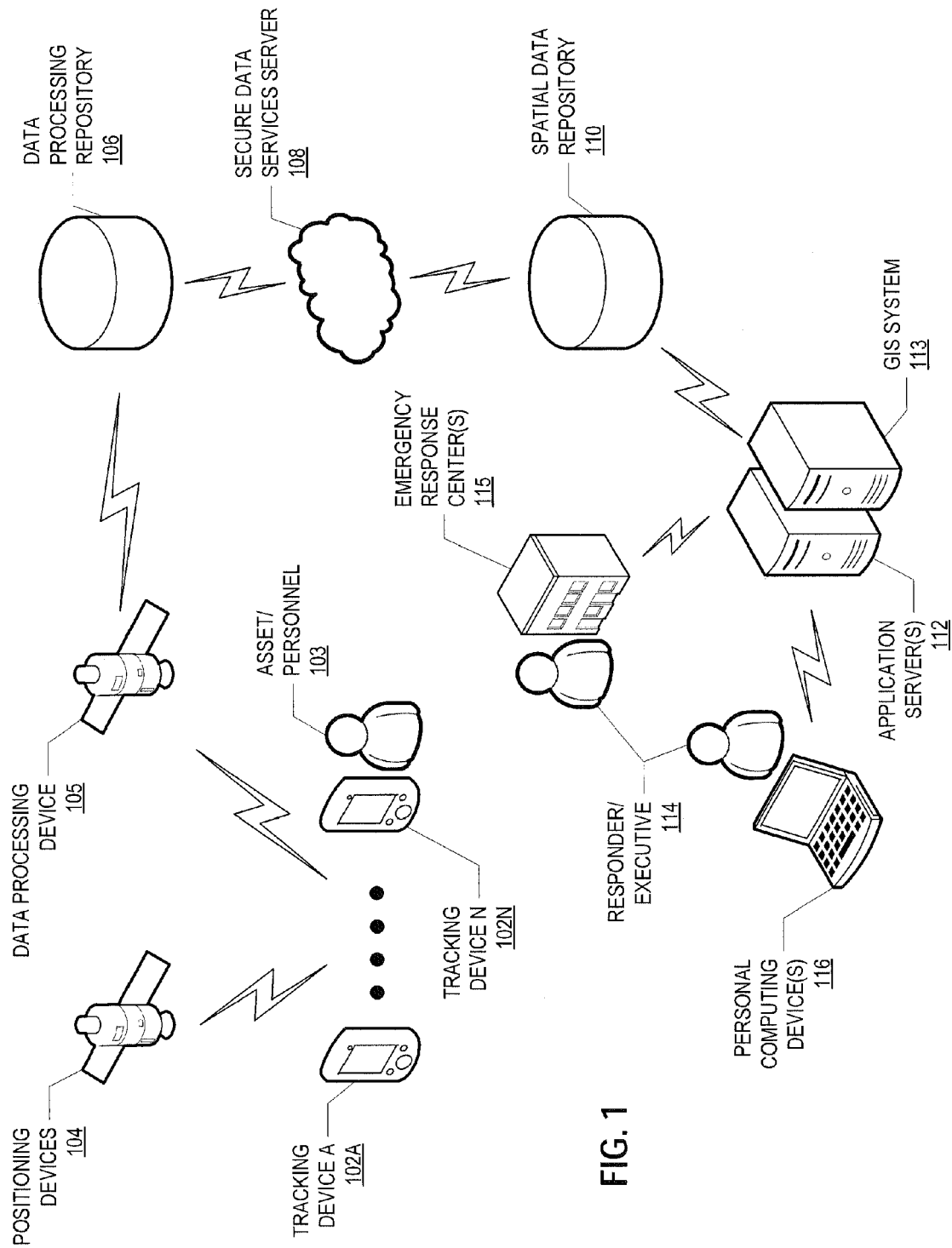
FIG. 1 is a schematic view of the tracking system constructed in accordance with one or more embodiments of the invention.

In one or more embodiments of the invention, the system as shown in FIG. 1 comprises one or more tracking device(s) (e.g., 102A, 102N). A positioning device 104 is configured to provide location information indicative of the location of the tracking devices (e.g., 102A, 102N). Specifically, the positioning devices 104 may include a satellite or network tower with a signal transmitter configured to provide radio frequency ("RF") signals to the tracking devices (e.g., 102A, 102N), where the RF signals allow a tracking device to determine a global location of the tracking device. For example, the positioning devices 104 may include a global positioning system (GPS), which includes multiple satellites that broadcast RF signals and navigation messages. In this example, the RF signals are used by the tracking devices (e.g., 102A, 102N) to determine the distance to each satellite, and the navigation messages are used to determine the location of each satellite. The distance to and location of each satellite may be used to determine the global location of a tracking device with the aid of, for example, triangulation.

The location determined using the positioning devices 104 may be transmitted by the tracking devices (e.g., 102A, 102N) to a data processing device 105. Additional data, such as the speed, bearing and status of the tracking device may also be transmitted to the data processing device 105. The data processing device 105, in turn, transmits the collected data to either a data processing repository 106, such as one managed by the satellite operator, or directly to the spatial data repository 110. If the data is transmitted to a data processing repository 106, secure data services 108 relay the data to the spatial data repository 110. Secure data services 108 may include a custom software module that intercepts the data messages and securely integrates them into the spatial data repository 110. The spatial data repository 110 may be, for example, part of an enterprise GIS system 113 that supports fluid spill and emergency response activities at all levels. Secure data services 108 leverages standard computing environments to facilitate ease of integration.

In some embodiments, spatial data describes the geographic location of features (e.g., points of interest, cities, geo-located images, etc.) and boundaries (e.g., rivers, county boundaries, state boundaries, country boundaries, etc.). Typically, spatial data is stored in the form of points, polylines, polygons, vectors, imagery, or some other shape. For example, geographic coordinates and associated metadata for points of interest may be stored in a point map layer. Tracking technologies such as transponders may be used to report the real-time location of moving assets such as large vessels or helicopters. This data may also be directly integrated into the GIS system 113 as a dynamic point layer, and co-analyzed with static GIS layers. In another example, boundaries and associated metadata for geographic areas may be stored in a polygon map layer. Spatial queries may be performed between mapping layers by performing spatial comparisons (e.g., comparisons for intersections, comparisons for disjointedness, etc.) of the shapes in each of the mapping layers. In this case, new information may be derived, such as the exact distance between a tracking device and a pollution control vessel at a known location as determined through an automatic identification system (AIS) transponder. Such derived data can be stored within the spatial data repository 110, and relayed to decision makers through the GIS system 113.

An application server(s) 112 securely accesses and manipulates the data stored in the spatial data repository 110. The application server(s) 112 may load the data into enterprise databases, such as the ORACLE® Database. In one or more embodiments, the application server(s) 112 use robust programming methods and industry standards, such as the JAVA® programming language and libraries, to ensure portability into standard enterprise computing infrastructures. The application server(s) 112 may be compatible with most large-scale, corporate computing environments, taking little technical support to integrate with current system standards. ORACLE® and JAVA® are registered trademarks of Oracle Corporation, a corporation organized under the laws of Delaware and headquartered at 500 Oracle Parkway, Redwood Shores, Redwood City, Calif., United States.

The application server(s) 112 present the data for dynamic display in commercial Geographical Information Systems (GIS) 113 such as ARCGIS® Server and GOOGLE EARTH™ mapping service. For example, the GIS system 113 may render a real-time response map for a wall display of a Control Center 115 during an emergency response. These advanced mapping technologies enable incident responders and executive stakeholders 114 to concurrently view the status of offshore operations on a real-time, interactive map display. The live data may be pushed directly to incident commanders and executive stakeholders 114 in a value-added form, to support tactical decision-making in real-time.

In one embodiment, after deploying the tracking devices around the perimeter and in the approximate center of an oil slick, the data can be remotely monitored in multiple emergency response centers 115, 24 hours a day throughout the duration of any incident. In other embodiments, the tracking devices may be deployed in the leading edges, the center, the trailing edges, and the side flanks of the oil slick for remote monitoring via a personal computing device(s) or portable mobile device(s) 116. ARCGIS™ is a registered trademark of Esri, a private company headquartered in Redlands, Calif., United States. GOOGLE EARTH™ is a registered trademark of Google Inc., a corporation organized under the laws of Delaware and headquartered in Mountain View, Calif., United States.

In one or more embodiments, the fluid spill may include any combination of an oil fluid, a chemical composition fluid, and a hydrocarbon-based fluid. In one or more embodiments, the tracking devices may be used to measure, record and map the sea-surface currents without the presence of any contaminant(s).

In one or more embodiments, the tracking devices (e.g., 102A, 102N) may communicate data to each other over a mesh network. For example, a tracking device may transmit the positioning signal it receives from the positioning device(s) 104 to other nearby tracking devices. In this example, the positioning signal may then be used by the other tracking devices to improve their GPS functionality in, for example, bad weather conditions. In another example, a tracking device (e.g., 102A, 102N) that is unable to communicate with the data processing device 105 may transmit location data to neighboring tracking devices, which then relay the location data to the data processing device 105 (i.e., the mesh network allows for fault tolerant communications with the data processing device 105).

Figure 2A:
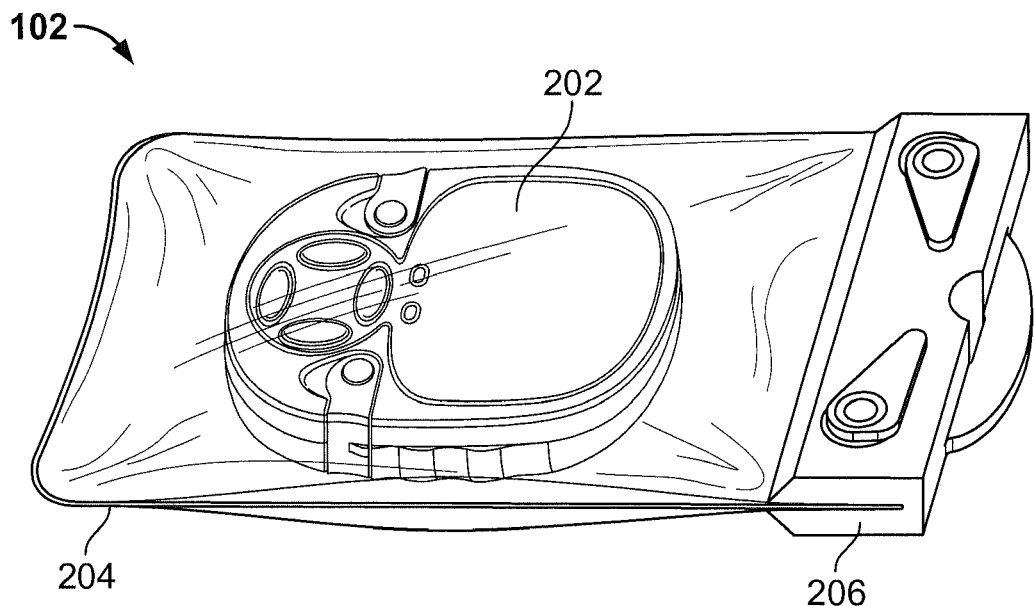
FIG. 2A is a plan view of the floatation device constructed in accordance with one or more embodiments of the invention.

Turning to FIG. 2A, tracking device 102 (e.g., 102A, 102N) comprises a GPS tracking unit 8. Tracking device 102 is small and light weight, has a ruggedized design to withstand harsh environmental conditions, provides reliable satellite data transmission, has optimized battery performance and power usage, and is low-cost. The power source may be, for example, batteries which are contained within the tracking device 102. The power source should be such that the GPS unit 202 remains active and operable to report data to the positioning device(s) 104 for an extended period of time, for example, for a number of weeks or a number of months.

GPS units 202 are commercially available for other dedicated purposes, such as the SPOT SATELLITE GPS MESSENGER™, which has a mass of 209 grams and is 9.4 cm by 6.6 cm by 2.5 cm. Alternative GPS units 202 may be of similar size or may be even smaller and lighter weight. The SPOT SATELLITE GPS MESSENGER™ may be purchased from retailers for around $100. However, the SPOT SATELLITE GPS MESSENGER™, which is designed for tracking people conducting adventure sports in remote areas, has never been applied to fluid spill or marine asset tracking applications and requires additional components to be capable of operating as discussed with respect to the system of the current application. SPOT SATELLITE GPS MESSENGER™ is a trademark of SPOT LLC, a company headquartered in Milpitas, Calif., United States.

Tracking device 102 is enclosed within a waterproof, floating container 204 to protect the device from the extremely corrosive effects of sea water and crude oil. In one embodiment, container 204 is a flat and light (almost weightless), envelope-shaped bag. The tracking device 102 represents a significant design change from the traditional circular or 'flower pot' shaped tracking buoys of prior embodiments. The outer covering of the container 204 may be made of a flexible but water resistant material such as a polyurethane plastic. Such a design of container 204 minimizes both water surface displacement and wind and sea current 'drag', and gives the tracking device(s) (e.g., 102A, 102N) a more consistent trajectory. Specifically, in some embodiments, the container 204 may have (1) a substantially flat upper surface that is adapted to minimize wind drag and water surface displacement and (2) a substantially flow lower surface that is adapted to minimize sea current drag. For example, the container 204 may be envelope shaped such that the perimeter of the container 204 tapers to an edge around the GPS unit 202 therein. In this case, the envelope shape of the container 204 helps ensure that the container 204 more closely follows sea currents.

In some embodiments, container 204 has an opening on one end to receive the tracking device 102. The opening is sealed closed with sealing member 206, which prevents the flow of fluids into the interior of container 204. Container 204 may be low profile, such that when deployed on the surface of the water, the entire tracking device 102 is at or near the surface of the water. Tracking device 102 should not project a significant distance either above or below the surface of the water. This allows for accurate representation of the movement of the surface layer of the water or the movement of other fluids floating at the surface of the water, such as crude oil. In one embodiment, the thickness, or profile, of tracking device 102 is less than 2.5 cm.

Figure 2B:
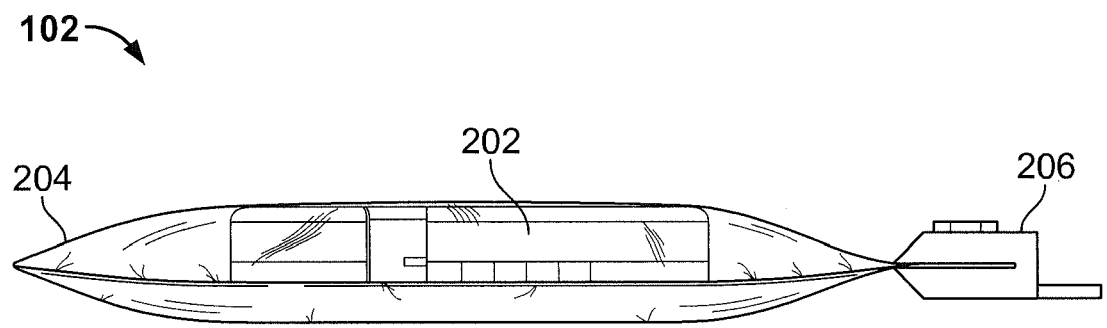
FIG. 2B is a side view of the floatation device of FIG. 2A.

As seen in both FIG. 2A and FIG. 2B, a custom designed floating container 204 may be used and designed with the weight, weight distribution, and aerodynamic properties such that when combined with tracking device 102, the movement of the tracking device 102 corresponds to the movement of the desired object to be emulated. Alternatively, a commercially available container 204 may be used, such as Kwik Tek's DRY PAK®. Because tracking device 102 is low weight and has a slim profile, there is minimal water displacement or wind drag and tracking device 102 may follow the movement of a desired object without further alteration. Alternatively, tracking device 102 may be ballasted to float at the same velocity and in the same direction as the desired object. Depending on the application of the tracking device, the desired object may be, for example, the sea surface itself, a contaminant floating on the sea surface such as a fluid spill, or a toxic algal bloom. DRY PAK® is a registered trademark of Kwik Tek Inc., a corporation organized under the laws of Colorado and headquartered at 16163 W. 45th Dr. Unit D., Golden, Colo. 80403.

If ballast is required, ballast (not shown) may be added to container 204 so that the tracking device 102 floats at the same velocity and in the same direction as a sea surface, target crude oils, or other desired objects, as applicable, in a range of weather conditions. The ballast may also be situated so that the tracking device 102 remains upwards facing to maximize satellite communications capabilities. Ballast may be adjusted depending on the crude oil grades, weather, and sea-state conditions. The ballast is placed within container 204 and is removable, adjustable and providing a snug fit in the container 204. Ballasting material may include a variety of materials including air, dense pellets, or a rubberized material which encases Tracking device 102. For example, the ballast may comprise: two small "C" shaped molds of cement or similar composite material, placed at each end of container 204; two or more small metal blocks placed and balanced at each end of container 204; an optimal number of small lead balls; a small volume of beach sand, spread evenly across the container 204; or some combination of these or other useable ballast materials. When using smaller grained loose material for ballast, such as sand or lead balls, the ballast material may have the added benefit of moving slightly with the waves to compensate for the forces acting on the water surface.

The tracking device 102 used for test purposes had a mass of 174 grams and measured approximately 18 cm by 10 cm by less than 2.5 cm thick. The total cost of the test tracking device 102 was less than $300 retail for the hardware components. At such a low cost, many dozens of tracking devices (e.g., 102A, 102N) may be adapted to be economically deployed around the entire perimeter, as well as at the approximate center, of a fluid spill. In an oil spill, the lighter oils travel more quickly and thus are present at the leading edges of a spill, and the heavier oils remain closer to the center or near the trailing edges of a spill. Deploying multiple tracking device(s) (e.g., 102A, 102N) at the perimeter as well as near the approximate center of the oil slick provides a statistically and physically realistic delineation of the slick's shape and its movement patterns. This would, in turn, drive more accurate tactical decision-making by the incident commanders and executive stakeholders 114. The low cost and small size of tracking devices (e.g., 102A, 102N) allow for the deployment of multiple—potentially even hundreds—of tracking devices (e.g., 102A, 102N) in this manner.

In operation, a number of tracking devices (e.g., 102A, 102N) may be kept on-hand at a marine vessel, project or work-place. During an emergency or exercise, the workers could insert the power supply into the tracking device 102 then rapidly activate the tracking device 102, for example by pushing an "on" button. The GPS units 202 are pre-configured to securely communicate with positioning device(s) 104 so there are no other steps required to prepare the tracking device 102. The one or more tracking devices (e.g., 102A, 102N) are then ready to be released in a marine environment, directly onto the sea surface. In one embodiment, multiple tracking devices (e.g., 102A, 102N) may be loaded on a helicopter and dropped around the entire perimeter of, as well as in the approximate center of, a fluid spill. In alternative embodiments, such as when gathering sea current data or during a man overboard event, either real or for training purposes, a single tracking device(s) (e.g., 102A, 102N) may be adapted to be deployed at the sea surface at a desired starting point. Alternatively, the tracking devices (e.g., 102A, 102N) could be adapted to be deployed from the side of a vessel.

If during a long term event, the tracking devices (e.g., 102A, 102N) may need to be re-positioned. In this case, the tracking devices (e.g., 102A, 102N) can be retrieved from a vessel and re-deployed at another location. Redeployment may be required, for example, if the tracking devices (e.g., 102A, 102N) have separated from the oil slick. In this case, the ballast in container 204 may be adjusted before re-deploying the tracking device 102 so that the movement of tracking device 102 better corresponds to the movement of the oil slick within prevailing sea and weather conditions. Because the tracking devices (e.g., 102A, 102N) use GPS technology, they could be rapidly located, day or night, for retrieval or re-positioning.

The tracking device 102 may have been pre-ballasted to match the movement in the sea of the desired object such as the sea surface or crude oil. The amount of ballast and its location within container 204 is determined by taking into consideration such things as the crude oil grades, weather, and sea-state conditions, as applicable. Alternatively, the low weight and slim profile of the tracking devices (e.g., 102A, 102N) may be such that no ballast is required for them to match the movement of the desired object.

After activating and releasing the required number of tracking devices (e.g., 102A, 102N), the tracking devices (e.g., 102A, 102N) may begin receiving a positioning signal from the positioning device(s) 104. For example, the positioning signal may correspond to a GPS signal received from a GPS satellite, where the GPS signal is used to determine the location, speed, and bearing of the tracking devices (e.g., 102A, 102N). The location, speed, and bearing may then be transmitted from tracking devices (e.g., 102A, 102N) to a data processing device 105. The data processing device 105 may be a satellite configured to relay the data received from the tracking devices (e.g., 102A, 102N). Transmitted data may also include the status of the tracking device (i.e., data indicating whether the device is operating properly) and a precise timestamp when each measurement was recorded. The transmitted data may be gathered in regular short intervals, such as every 10 minutes.

Data processing device 105 then transmits the collected data to either a data processing repository 106 or directly to the spatial data repository 110. If the data is transmitted to a data processing repository 106, secure data services 108 may relay the data to the spatial data repository 110. Application server(s) 112 securely access and manipulate the data received by the spatial data repository 110. The application server(s) 112 present the data for dynamic display through real-time GIS systems 113. The data can be remotely monitored in multiple emergency response centers 115, 24 hours a day throughout the duration of the event to allow for accurate tactical decision-making by the incident commanders and executive stakeholders 114.

At the completion of the event or if the power sources of the tracking devices (e.g., 102A, 102N) are nearly depleted, the tracking devices (e.g., 102A, 102N) are retrievable. The power sources, internal batteries for example, can be replaced or recharged and the tracking devices (e.g., 102A, 102N) may be used again immediately, or stored to be used for a future event. If there is an extended period of time between the retrieval of the tracking devices (e.g., 102A, 102N) and their re-deployment, the power source may be removed from the tracking device 102 to avoid potential corrosion.

If the tracking device 102 has been deployed in a fluid spill or similarly potentially damaging environment, the container 204 may be properly disposed and a new container 204 provided for the tracking device 102. If the tracking device 102 has been deployed in an uncontaminated marine environment, the container 204 may be re-used a number of times and replaced only when the end of its useful life has been reached, which may vary depending on such factors as its prolonged exposure to sunlight, high temperatures, high humidity and highly saline water.

During extensive field trials of the tracking device 102, the container 204 was left floating for weeks in highly saline water contaminated with oil, in 45° F. ambient air temperature and direct daylight. The container 204 exhibited no signs of deterioration. Because the field tested tracking device 102 were enclosed in strong marine-grade plastics, the container 204 was able to withstand extreme environmental conditions.

Figure 3:
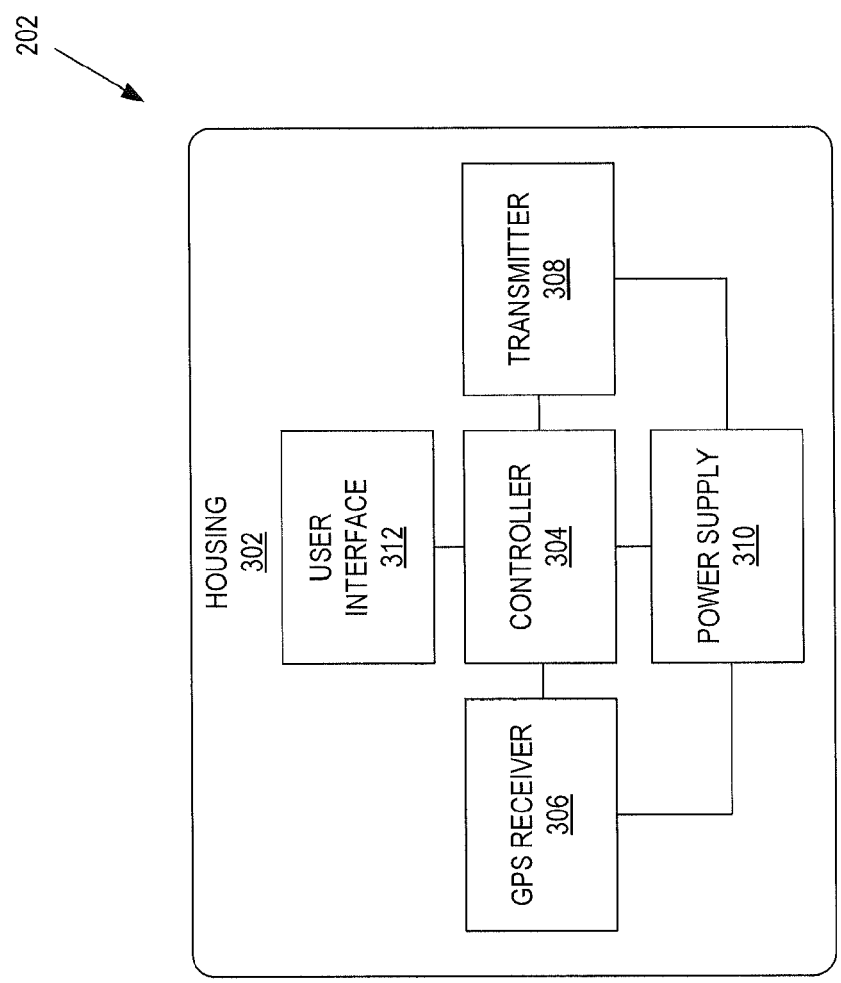
FIG. 3 is a schematic view of global positioning system unit in accordance with one or more embodiments of the invention.

FIG. 3 shows a GPS unit 202 in accordance with certain embodiments. The GPS unit 202 shows a housing 302 that encloses a controller 304, a GPS receiver 306, a transmitter 308, a battery 310, and a user interface 312. As discussed above, the GPS unit 202 may be a SPOT SATELLITE GPS MESSENGER™, which has a housing 302 that is adapted to be held in a single hand of the user of the GPS unit 202. The housing 302 may include rigid materials such as plastic, steel, aluminum, etc. on which a circuit board (not shown) including the components is mounted. In some embodiments, the housing 302 may be wholly sealed and water-proofed thereby allowing the GPS unit 202 to operate in harsh environments and conditions.

The controller 304 may include one or more central processing units (processors) configured to control the GPS receiver 306, the transmitter 308, and the user interface 312. For example, the controller 304 may be a microcontroller including a processor core and memory. In this case, the processor(s) of the microcontroller are configured to operate the GPS receiver 306, the transmitter 308, and the user interface 312 according to program instructions stored in the memory.

The GPS receiver 306 is configured to receive GPS signals from three or more GPS satellites. As discussed above, the GPS signals may be used to accurately determine the current geographic location of the GPS unit 202. In some embodiments, the GPS receiver 306 may include a separate processor to determine the geographic location of the GPS unit 202 based on the GPS signals. Alternatively, the microcontroller 306 may determine the geographic location of the GPS unit 202 based on the positioning signals received from the GPS receiver 306. The GPS receiver 306 is configured to receive GPS signals at a satellite frequency of 1.17-1.58 GHz. Specifically, GPS signals are typically broadcasted by GPS satellites 104 of FIG. 1 at 1.57542 GHz and 1.2276 GHz.

The transmitter 308 is configured to transmit location data (e.g., geographic location determined using the GPS signal) to a commercial satellite 105 of FIG. 1. For example, the transmitter 308 may be a simplex transmitter unit, which is a compact satellite module configured to communicate with commercial satellites 105 of FIG. 1. In this example, the commercial satellite 105 of FIG. 1 may be a low earth orbit satellite in the GLOBALSTAR™ constellation, which is used for satellite phones and low-speed data communications. When communicating with the GLOBALSTAR™ constellation, the transmitter 308 may be configured to send the location data at a frequency of 1610-1626 GHz. As discussed above, the commercial satellite 105 of FIG. 1 may then relay the location data for storage in a data processing repository 106 of FIG. 1 or spatial data repository 110 of FIG. 1. GLOBALSTAR™ is a trademark of GlobalStar, Inc., a company headquartered in Covington, La., United States.

In some embodiments, the GPS unit 202 may also include a local transmitter (not shown) configured to communicate with nearby GPS units via a mesh network. The local transmitter may use radio frequency signals (e.g., WI-FI™, BLUETOOTH®, etc.) to allow the GPS unit 202 to communicate directly with other GPS units. The local communication may be performed for a variety of reasons including enhancing GPS functionality, fault tolerance in communicating location data to the commercial satellite (105 of FIG. 1), etc. WI-FI™ is a trademark of the Wi-Fi Alliance, a trade association based in Austin, Tex., United States. BLUETOOTH® is a registered trademark of Bluetooth SIG, Inc., a privately held, not-for-profit trade association headquartered in Kirkland, Wash., United States.

The power supply 310 provides operating power to the controller 304, the GPS receiver 306, and the transmitter 308. For example, the power supply 310 may include standard AA or AAA lithium ion batteries that are maintained as needed during deployment of the GPS unit 202. The power supply 310 may also include a sensor to detect the current charge level of the batteries. In some embodiments, solar cells may be used to actively charge or even fully power the GPS unit 202.

The user interface 312 is configured to receive input or provide output for a user of the GPS unit 202. The user interface 312 may include light-emitting diode (LED) notification lamps that notify the user of the status of various components (e.g., low battery indicator, GPS connection status, etc.) of the GPS unit 202. The user interface 312 may also include buttons that allow the user to provide commands to the GPS unit 202. For example, the user interface 312 may include an SOS button that once pressed by the user, instructs the GPS unit 202 to send a distress signal including the precise geographic location of the GPS unit 202 to the commercial satellite 105 of FIG. 1. In this example, the GPS unit 202 may be affixed to response personnel participating in an emergency response or other oil-related activity, where the distress signal may be denoted on a real-time GIS map generated by the GIS system 113 of FIG. 1 based on location data obtained from the GPS unit 202. In another example, the user interface 312 may include a power button that may be used to activate the GPS unit 202 prior to deployment and then to deactivate the GPS unit 202 after an incident (e.g., oil spill) has been resolved.

FIGS. 4A and 4B show cross sectional, side views of a tracking device 102 in accordance with certain embodiments. In FIG. 4A, the tracking device 102 is shown as deployed on a surface of a fluid 401 (e.g., seawater, oil spill, etc.). The cross section shows the GPS unit 202 in the interior region of the container 204, where the thickness 402 of the tracking device 102 is defined by the placement of the GPS unit 202 in the container 204. Further, a posterior buoyancy pocket 406 and an anterior buoyancy pocket 408 are formed by the placement of the GPS unit 202 in the container 204 after the sealing member 206 is sealed, trapping a volume of air inside buoyancy pockets 406, 408.

The buoyant force 410 acting on the tracking device 102 may be determined based on the depth 404 of the tracking device 102 in the fluid 401. In FIG. 4A, the posterior buoyancy pocket 406 and the anterior buoyancy pocket 408 contain air resulting in relatively less buoyant force 410 in comparison to a tracking device having weighted ballast (102 of FIG. 4B). For example, the buoyant force 410 acting on an example tracking device 102 with a mass of 174 grams is around −1.74 N. TABLE 1 below shows the volume of fluid displaced by the example tracking device 102 with a mass of 174 grams in varying grades of crude oil and in seawater when the example tracking device 102 achieves a buoyant force of around −1.74 N.

TABLE 1 fluid volumes displaced by example tracking device when deployed

| Fluid | Density of Fluid (g/mm³ at 16° C.) | Displaced Vol. of Fluid (mL) |
| --- | --- | --- |
| Crude oil, 48° API | 0.790 | 224 |
| Crude oil, 40° API | 0.825 | 215 |
| Crude oil, 35.6° API | 0.847 | 209 |
| Crude oil, 32.6° API | 0.862 | 205 |
| Crude oil, California | 0.915 | 193 |
| Crude oil, Mexican | 0.973 | 182 |
| Crude oil, Texas | 0.873 | 203 |
| Seawater | 1.020 | 174 |

TABLE 1 shows that the volume displaced by the example tracking device 102 to achieve a buoyant force of −1.74 N increases as the density of the fluid 401 decreases. In other words, the depth 404 of the tracking device 102 in the fluid 401 increases as the density of the fluid 401 decreases. An example tracking device 102 with a length of 175 mm, a width of 100 mm, and a thickness of 25 mm has a volume of about 300-350 mL. The depth 404 of the tracking device 102 in the fluid 401 affects the trajectory of the tracking device 102. In order to match the trajectory of the tracking device 102 to a target fluid 401 (e.g., crude oil in an oil spill), ballast may be used as shown in FIG. 4B.

The volume and mass of the tracking device 102 may vary depending on the GPS unit 202 and container 204 used. For example, a SPOT Personal Tracker having a height of 11.1 cm, a width of 6.9 cm, a thickness of 4.4 cm, and a mass of 209 g may be used as the GPS unit 202. In this example, the tracking device 102 would have a volume of about 500-600 mL.

In FIG. 4B, posterior ballast 414 and anterior ballast 416 are contained in the buoyancy pockets 406, 408 of the tracking device 102. The ballast 414, 416 is shown as "C" shaped molds. In this example, the tracking device 102 is thicker at the posterior buoyancy pocket 406 than at the anterior buoyancy pocket 408 due to the shape of the GPS unit 202. Accordingly, in FIG. 4B, the anterior ballast 416 is thinner to better fit the top portion of the GPS unit 202 when placed in the container 204. Despite the difference in size, the posterior ballast 414 and the anterior ballast 416 may have substantially equivalent masses such that balance is maintained on the ends of the container 204, thereby ensuring the trajectory of the tracking device 102 better matches the trajectory of the target fluid 401.

In some embodiments, the ballast 414, 416 may be configured according to a variety of environmental factors such as sea currents, wind direction and velocity, water temperature, surface pressure, type of fluid, etc. For example, the amount of ballast 414, 416 may be determined according to the grade of the crude oil. In this example, as the density of the crude oil decreases, less ballast 414, 416 may be used in order to maintain the same depth 404 of the tracking device 102 in the fluid 401.

Figure 5:
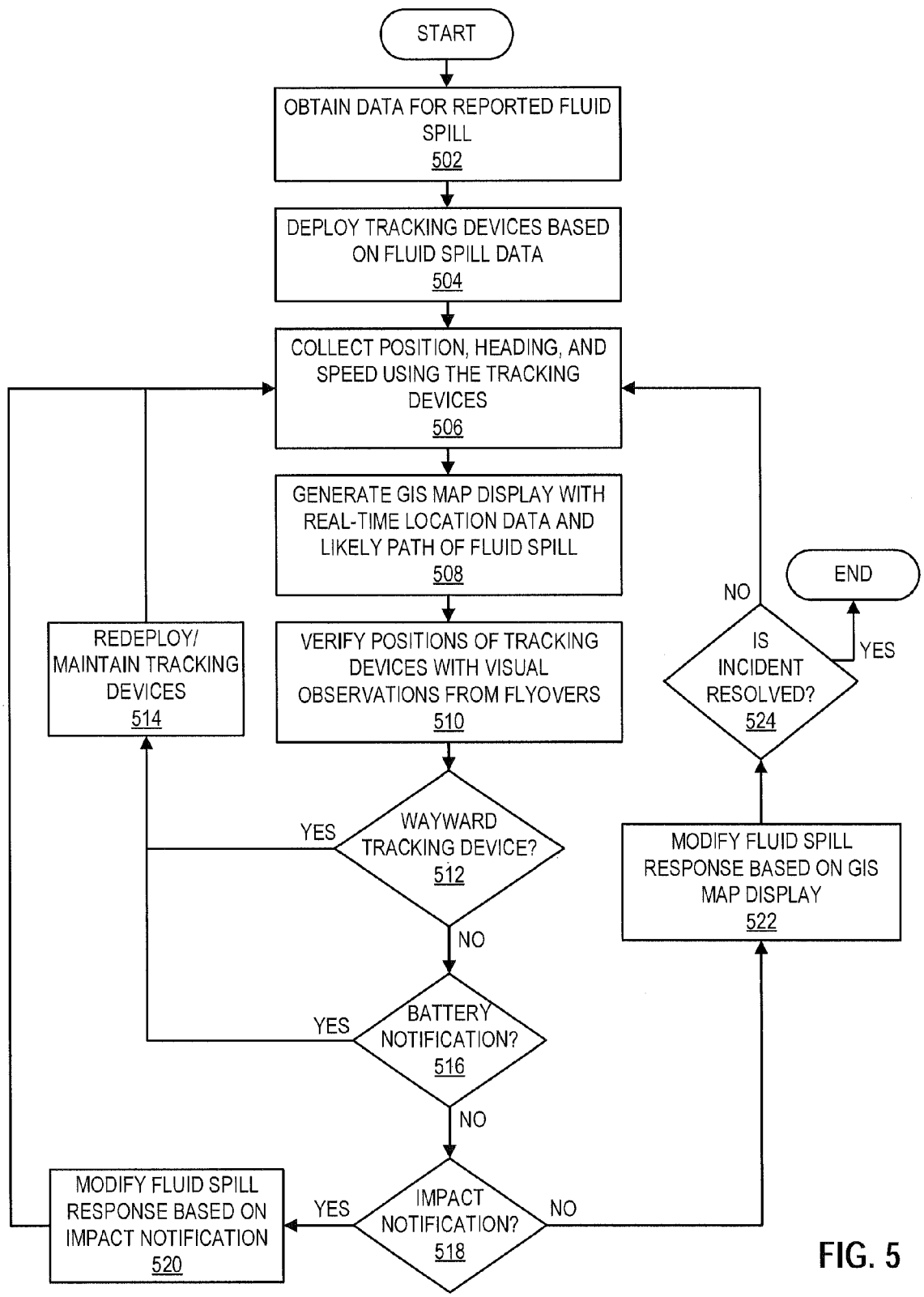
FIG. 5 is a method flowchart in accordance with one or more embodiments of the invention.

FIG. 5 shows a method flowchart in accordance with certain embodiments. More specifically, FIG. 5 is a flowchart of a method for tracking surficial movement in a marine environment. The movement of a fluid spill may be tracked for a fluid spill response or for other purposes. As is the case with the other processes described herein, various embodiments may not include all of the steps described below, may include additional steps, and may sequence the steps differently. Accordingly, the specific arrangement of steps shown in FIG. 5 should not be construed as limiting the scope of the invention.

In 502, initial data for a reported fluid spill is obtained. The initial data may include an initial location, a known oil type, an estimated volume, and an estimated slick size of the fluid spill. The initial data may be determined based on visual observations, aerial reconnaissance, vessel log data, etc. Once the initial data for the reported fluid spill is obtained, a spill response team may be deployed to the initial location of the fluid spill.

In 504, tracking devices are deployed at the fluid spill based on the initial data. More specifically, the spill response team may deploy the tracking devices at or near the initial location of the fluid spill using visual cues (e.g., oil sheen) and environmental factors such as ocean currents. For example, the spill response team may deploy a first set of tracking devices in the center of the fluid spill, a second set of tracking devices in the leading edges of the fluid spill, a third set of tracking devices in the trailing edges of the fluid spill, and a fourth 605 and fifth set 609 of tracking devices on both the outer flanks of the fluid spill to represent the width of the spill. Each of the tracking devices has a unique device identifier that is associated with the fluid spill before or during deployment. The unique device identifier may also be associated with the initial deployment zone (e.g., center, leading edges, trailing edges, etc.) of the corresponding tracking device. In some embodiments, the tracking devices may be deployed from a helicopter traveling over the fluid spill.

In some embodiments in 504, one or more tracking devices may also be preemptively deployed at a relevant distance ahead of the fluid spill's leading edge—for example, midway between the present location of the spill and the predicted shoreline landing point of the fluid spill. Tracking devices deployed for such analysis would be configured with a meaningful identifier code to differentiate them from other tracking devices deployed within the actual fluid spill. In this case, the preemptively deployed tracking devices could be tracked and rendered in the GIS system 113 of FIG. 1 to provide dynamic maps showing an early indication of the most likely shoreline contact points, assuming prevailing sea and weather conditions remain relatively constant. Such strategic insight may be invaluable to incident commanders and executive stakeholders 114 of FIG. 1, allowing them to optimize the preparation of shoreline protection measures such as containment booms (e.g., oil spill containment boom, chemical spill containment boom).

In 506, position, heading, and speed data is collected by the tracking devices along with the unique device identifier and a precise timestamp for each reading. Each of the tracking devices may be configured to periodically (e.g., every 10 minutes, etc.) determine its geographic location, heading, and speed based on location signals received from a positioning device (e.g., GPS satellite, network tower, etc.). Once the data is determined by a tracking device, the position, heading, and speed data may be transmitted to a data processing satellite, which may then relay the data for eventual incorporation into a spatial data repository.

In 508, a GIS map 113 is generated showing a real-time location and likely path (i.e., forecasted trajectory) of the fluid spill using the spatial data repository. The real-time location of the fluid spill may be calculated and modeled using advanced geo-statistical modeling techniques such as a concave hull algorithm. Alternatively the geographic center of fluid spill could be simplistically determined by statistically averaging the geographic locations of all the tracking devices deployed in the fluid spill in 504. For example, the geographic center of the tracking devices may be determined by calculating the centroid (e.g., center of gravity, equilibrium point, etc.) of the geographic locations.

In some embodiments, the concave hull process may be used to generate a concave hull polygon that closely approximates the location and shape of a fluid spill. In this case, the set of points from the tracking devices deployed in the fluid spill may be used to generate the concave hull polygon. For example, a concave hull process may be based on a k-nearest approach that classifies each point in the set of points based on the majority vote of its neighbors. In this example, different selections of k may be made to generate various concave hull polygons (e.g., a higher number k results in a smoother polygon). The k-nearest approach is described in Adriano et al., *Concave hull: a k-nearest neighbours approach for the computation of the region occupied by a set of points*, INSTICC Press published on Mar. 8, 2007, which is incorporated by reference herein in its entirety.

In another example, the concave hull process may be based on a shaving exterior edges approach. An exemplary algorithm for the shaving exterior edges approach is described below:

Generate the Delaunay triangulation of the set of points P.
Remove the longest exterior edge from the triangulation such that (1) the edge removed is longer than a length parameter l and (2) the remaining exterior edges of the triangulation form a simple polygon
Repeat removing the longest exterior edge so long as there are edges that satisfy the criteria above.
Return the polygon formed by the exterior edges of the triangulation.

The shaving exterior edges approach is described in Duckham et al., *Efficient generation of simple polygons for characterizing the shape of a set of points in the plane*, Pattern Recognition v41 published on Jan. 11, 2008, which is incorporated by reference herein in its entirety.

In other embodiments, the position and velocity of the forward or leading tracking devices could be used to represent the present trajectory and velocity of the spill. The location and trajectory of any preemptively deployed sensors may also be rendered by the GIS system 113 of FIG. 1 for display on GIS map displays.

In some embodiments in 508, the GIS system 113 of FIG. 1 may also visually render the present trajectory of the fluid spill as a single vector which is dynamically updated by summing the average velocity of all tracking devices deployed in the spill at any time period. In one embodiment, the vectors showing the present trajectory of the fluid spill are stored within the spatial data repository 110 to enable analysis and visualization of recent trajectory changes in the GIS system 113 of FIG. 1.

The likely path of the fluid spill may be determined by modeling the movement of the oil in a body of water such as an ocean. In this case, the likely path of the fluid spill may be modeled based on the historic path of the fluid spill as accurately determined by the tracking devices and a variety of environmental factors such as sea currents, wind direction and velocity, water temperature, surface pressure, etc. Because the tracking devices float ubiquitously on the sea surface with the oil, the tracking devices' movement and velocities collectively provide a detailed physical view of the prevailing sea and weather conditions.

In one or more embodiments, the reliance on 2D and 3D trajectory models is reduced. However, trajectory models such as the Parallel Ocean Program, a three-dimensional ocean circulation model developed by researchers at the Los Alamos National Laboratory, may still be utilized to forecast longer-term "what if" scenarios that incorporate external data sources such as 5-day weather forecasts. In this case, the data from actively deployed tracking devices is imported directly into the 2D or 3D trajectory models to significantly improve their resolution and statistical reliability.

In 510, the positions of the tracking devices are collectively verified with visual observations obtained by aerial flyovers and/or vessel-based observations. More specifically, the aerial flyovers may provide geo-referenced imagery of the fluid spill, which may be overlaid on the geographic locations of the tracking devices in the GIS map display 113 generated in 508. Wayward tracking devices no longer inside the perimeter of the fluid spill may be identified using the GIS map and the aerial imagery. Wayward tracking devices may also be discovered through dynamic, statistical correlation between the position and velocity of all tracking devices deployed within a given spill. For example, if one or more tracking devices were to significantly decelerate or even reverse their bearing, it may indicate a fault with the GPS receiver 306 of FIG. 3 or controller 304 of FIG. 3 of the GPS unit 202 of FIG. 3. Such a situation would warrant immediate extraction and replacement with another tracking device.

In 512, a determination is made as to whether there are any wayward tracking devices. If there is a wayward tracking device, the wayward tracking device is retrieved and redeployed inside the perimeter of the fluid spill in 514. While redeploying the tracking device, the tracking device may also be maintained (e.g., replace battery, modify ballast, etc.) to ensure continued operation of the device. For example, the ballast may be adjusted so that the tracking device remains within the fluid spill perimeter.

In 516, a determination is made as to whether a low battery notification has been received from any of the tracking devices. If a low battery notification has been received from a tracking device, the tracking device is retrieved and maintained to ensure continued operation of the device before redeploying the tracking device into the fluid spill in 514.

In 518, a determination is made as to whether an impact notification warning has been received from any of the tracking devices, either preemptively deployed, or deployed within the actual spill. An impact notification warning may be generated when it is determined that any of the tracking devices is within a predetermined distance of a critical location. Examples of critical locations may include water intakes, seaports, beaches, sensitive marine habitats, etc. If an impact notification warning has been received for a tracking device, the fluid spill response may be modified based on the impact notification warning 520. For example, spill response assets or personnel may be deployed to the geographic location of the tracking device associated with the impact notification warning. In this example, the spill response assets and personnel may also be equipped with tracking devices such that their locations are automatically included in the GIS map display rendered by the GIS system 113 of FIG. 1 in 508. This live and comprehensive tactical awareness allows nearby assets and personnel to be optimally positioned based on the impact notification warning.

In some embodiments, one or more tracking devices may be attached to deployed oil containment booms in order to track the location and physical configuration of the booms during a fluid spill response. For example, a tracking device may be attached to the middle of a boom thereby allowing the general location of the boom with respect to the fluid spill to be depicted on a map. In another example, a tracking device may be attached to each end of the boom thereby allowing the length and extent of the boom to be depicted on a map. Adding more tracking devices along the edge of the boom at intervals would enable the exact configuration of the boom to be accurately depicted in the live GIS map display rendered by the GIS system 113 of FIG. 1. In either case, the map depicting the position of the boom may be used to deploy the boom in a down-current position of the likely path of the fluid spill. The low cost of the envisioned tracking device supports a new level of data collection and deep tactical awareness.

In one or more embodiments, other tactical or operational notifications may be generated based on data obtained by the tracking devices. For example, the velocity of the tracking devices may be monitored and transmitted for storage in the spatial data repository. In this example, a sea-conditions notification may be generated if the average velocity of the tracking devices changes by a predetermined percentage. The change in average velocity may indicate that there is a significant change in sea conditions. Similar to as discussed above in 520, the fluid spill response may be responsively adjusted in direct response to a sea-conditions notification.

In one or more embodiments, a smaller spill response vessel (e.g. a fishing vessel) that is enlisted to assist with the spill response may be temporarily equipped with a tracking device for monitoring a location of that vessel. The use of low cost tracking sensors in this manner could supplement the use of automatic identification system (AIS) transponders, which all large marine vessels are required to carry by international maritime law. Using this hybrid tracking approach, the location of all vessels and assets involved in the response could be collectively displayed in the live GIS map display rendered by the GIS system 113 of FIG. 1.

In this case, the location of the vessel as determined by the tracking device could also be used to verify a live vessel position as determined by an automatic identification system transponder on the larger sea-craft.

In 522, the spill response may be modified based on the GIS map generated in 508. For example, spill response assets or personnel may be deployed based on the movement of the fluid spill shown in the GIS map.

In 524, a determination is made as to whether the fluid spill incident is resolved. If the incident is not resolved, the method may continue to 506. If the incident is resolved, the method may end. At this stage, the tracking devices may be retrieved and prepared for storage (e.g., disassembled, batteries removed, cleaned, etc.) until the devices are needed for a subsequent fluid spill or other sea surface data collection mission.

Figure 6:
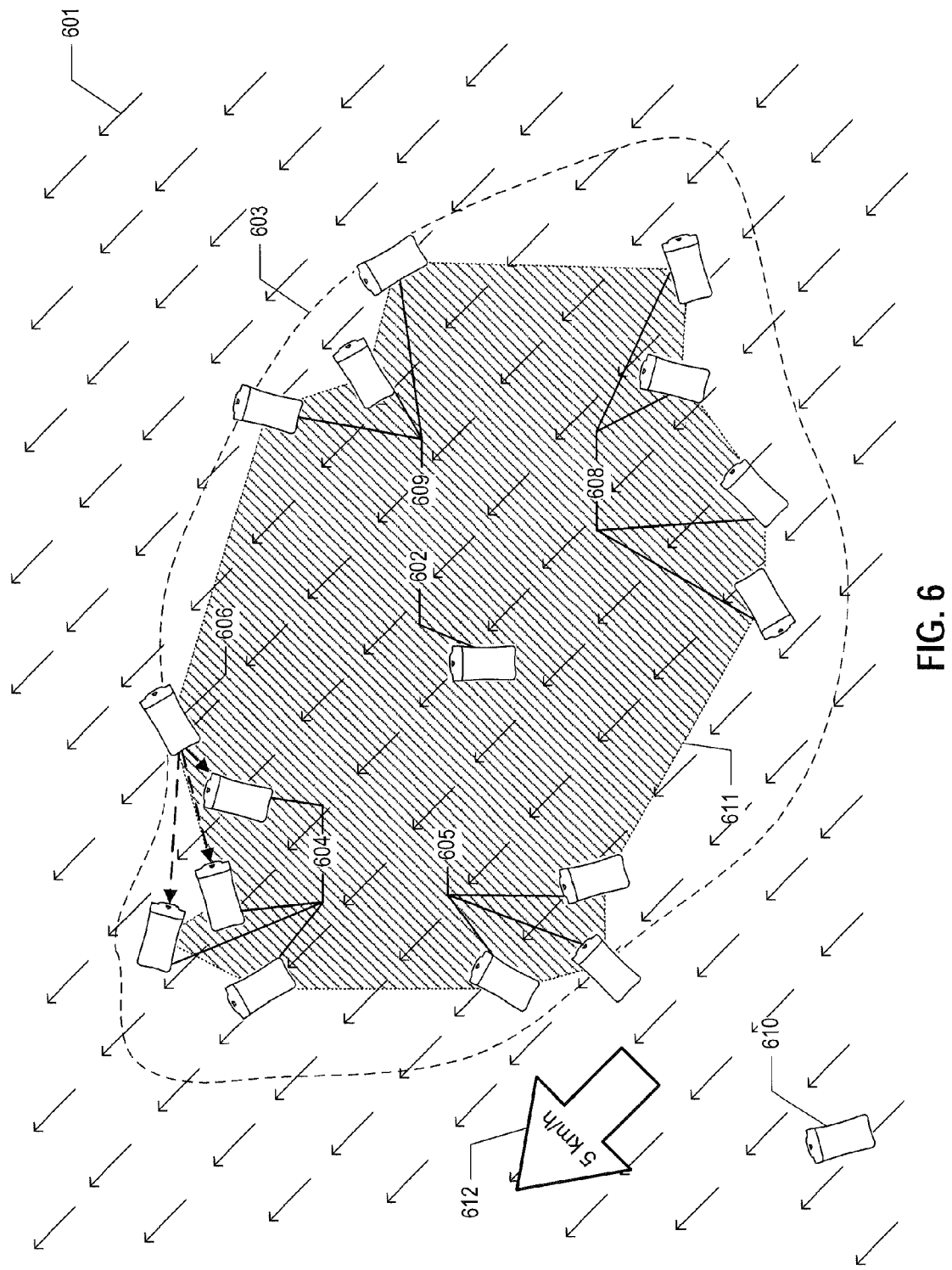
FIG. 6 is an example deployment of tracking devices in accordance with one or more embodiments of the invention.

FIG. 6 shows a number of tracking devices deployed in a fluid spill 603. In this example, the fluid spill 603 is shown as moving to the northwest due to sea currents 601. A tracking device 602 is deployed in the center of the fluid spill 603. Further, five tracking devices 604, 606 are deployed in the leading edge of the fluid spill 603, and five tracking devices 608, 610 are deployed in the trailing edge of the fluid spill 603. Another three tracking devices 605 are deployed to delineate the western edge or flank of the slick. Similarly, three tracking devices 609 are deployed to track the eastern flanking edge. In some embodiments, any number of additional tracking devices may be deployed along the perimeter of the fluid spill 603.

In FIG. 6, a tracking device 606 is shown that is unable to connect to the commercial satellite (105 of FIG. 1) in order to transmit location data. In this case, the tracking device 606 may form a mesh network with nearby tracking devices 604, where the location data is transmitted to a neighboring tracking device 604 that relays the location data to the commercial satellite (105 of FIG. 1). The mesh network allows the tracking devices 604, 606 to be somewhat fault tolerant in the event that one of the tracking devices 606 is unable to connect to the commercial satellite (105 of FIG. 1).

A wayward tracking device 610 is also shown outside the perimeter of the fluid spill 603. The wayward tracking device 610 may be identified based on location data provided by the wayward tracking device 610, where the geographic location of the wayward tracking device 610 is outside the perimeter of the fluid spill 603 as shown in aerial imagery. In this case, the wayward tracking device 610 may be retrieved and redeployed in the perimeter of the fluid spill 603 as discussed above.

Because the tracking devices 602, 604, 606, 608, 610 are low cost, a relatively large number of tracking devices 602, 604, 606, 608, 610 may be deployed in the fluid spill 603. Using the location data from all of the tracking devices 602, 604, 606, 608, 610; the geographic location of the oil spill may be more accurately determined in real time as a concave hull polygon 611, which encapsulates all tracking devices 602, 604, 606, 605, 608, 609, 610.

In some embodiments, the average velocity and direction of all sensors deemed valid may be constantly calculated and dynamically represented as a single spill vector 612. The spill vector 612 constantly changes as new sensor readings are inserted into the spatial data repository 110 of FIG. 1. The spill vector 612 is displayed on the live GIS map display rendered by the GIS system 113 of FIG. 1, where the spill vector 612 may be analyzed and displayed with previous spill vectors to gauge the overall progression of the spill over selected timespans.

This invention and this application relate to co-pending U.S. Non-provisional patent application Ser. No. 13/454,780, by O'Regan et al, titled "Method, System, and Machine to Track Fluid Spills When Moving With Water Flow," filed on Apr. 24, 2012, incorporated by reference herein in its entirety.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, or to about another particular value. When such a range is expressed, it is to be understood that another embodiment is from the one particular value or to the other particular value, along with all combinations within said range.

Throughout this application, where patents or publications are referenced, the disclosures of these references in their entireties are intended to be incorporated by reference into this application, in order to more fully describe the state of the art to which the invention pertains, except when these reference contradict the statements made herein.

That claimed is:

1. A method for tracking movement in a marine environment comprising:
    associating a plurality of tracking devices with a fluid spill event;
    deploying the plurality of tracking devices in a fluid spill, each tracking device of the plurality of tracking devices transmitting a geographic location of the tracking device to a data processing satellite;
    monitoring the geographic location of each tracking device of the plurality of tracking devices to track the movement of the fluid spill over a period of time;
    determining a forecasted trajectory of the fluid spill based on the movement of the fluid spill over the period of time;
    adjusting a spill response based on the forecasted trajectory;
    attaching an asset-tracking device to a spill response asset;
    deploying the spill response asset based on the forecasted trajectory of the fluid spill; and
    monitoring the asset location of the spill response asset using the asset-tracking device.

2. The method as claimed in claim 1, wherein the spill response asset is a containment boom, the asset-tracking device being attached to a middle portion of the containment boom, and wherein the containment boom is adapted to be deployed in a down-current position of the forecasted trajectory of the fluid spill.

3. The method as claimed in claim 1, further comprising:
    obtaining geo-referenced aerial imagery of the fluid spill that is captured by flyover reconnaissance;
    identifying a wayward device of the plurality of tracking devices that is outside a perimeter of the fluid spill based on the geo-referenced aerial imagery; and
    redeploying the wayward device inside the perimeter of the fluid spill.

4. The method as claimed in claim 1, further comprising:
    receiving a battery notification that a depleted device of the plurality of tracking devices has low battery power;
    retrieving and maintaining the depleted device; and
    redeploying the depleted device in the fluid spill.

5. The method as claimed in claim 1, wherein a first subset of the plurality of tracking devices are deployed in leading edges of the fluid spill, a second subset of the plurality of tracking devices are deployed in a center of the fluid spill, a third subset of the plurality of tracking devices are deployed in trailing edges of the fluid spill, and a fourth and fifth subset of the plurality of tracking devices are deployed on the sideward edges of the fluid spill.

6. The method as claimed in claim 1, further comprising:
preemptively deploying one or more tracking devices at a predetermined distance between a present location of the fluid spill and an expected shoreward landing point along the forecasted trajectory of the fluid spill; and
monitoring a preemptive location of one or more tracking devices to obtain an early indication a future location of the fluid spill.

7. The method as claimed in claim 1, wherein monitoring the geographic location of each tracking device of the plurality of tracking devices to track the movement of the fluid spill over a period of time further comprises:
dynamically determining the overall extent of the plurality of tracking devices using a concave hull polygon to approximate the location of the fluid spill, wherein the fluid spill comprises one or more of an oil fluid, a chemical composition fluid, and a hydrocarbon-based fluid;
dynamically averaging the position and velocity of the plurality of tracking devices within the concave hull polygon to produce a plurality of fluid spill vectors of a location of the fluid spill over time; and
enabling the plurality of fluid spill vectors to be retrieved from a spatial data repository to determine the forecasted trajectory of the fluid spill.

8. The method as claimed in claim 7, further comprising:
identifying a wayward device of the plurality of tracking devices that is outside a perimeter of the fluid spill by performing an automatic statistical comparison of the plurality of fluid spill vectors; and
redeploying the wayward device inside the perimeter of the fluid spill.

9. The method as claimed in claim 1, further comprising:
receiving an impact warning notification that one of the plurality of tracking devices is within a predetermined distance of a critical location; and
deploying spill response assets based on the impact warning notification.

10. The method as claimed in claim 1, further comprising:
monitoring a velocity of each tracking device of the plurality of tracking devices;
automatically calculating an average velocity of the fluid spill based on the velocities of the plurality of tracking devices; and
transmitting a sea-conditions warning notification when the average velocity changes by a predetermined percentage.

11. The method as claimed in claim 1, further comprising:
monitoring locations of a plurality of vessels involved in a fluid spill response using a combination of vessel-tracking devices and automatic identification system (AIS) transponders.

* * * * *